(12) United States Patent
Wampole

(10) Patent No.: US 6,238,204 B1
(45) Date of Patent: May 29, 2001

(54) INJECTION MOLDING SYSTEM WITH PRESSURE BUSHING LOCATING RING

(75) Inventor: Richard J. Wampole, Chippewa Falls, WI (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 09/388,213

(22) Filed: Sep. 1, 1999

(51) Int. Cl.$^7$ .................................................. B29C 45/17
(52) U.S. Cl. ............................................................ 425/567
(58) Field of Search ............................................. 425/567

(56) References Cited

U.S. PATENT DOCUMENTS

| | | |
|---|---|---|
| 4,285,660 | 8/1981 | Mueller . |
| 4,340,156 | 7/1982 | Mueller . |
| 4,580,037 | 4/1986 | Muller . |
| 4,609,341 | 9/1986 | Muller . |
| 4,631,389 | 12/1986 | Muller . |
| 4,682,944 | 7/1987 | Muller . |
| 4,689,473 | 8/1987 | Muller . |
| 4,692,595 | 9/1987 | Muller . |
| 5,051,563 | 9/1991 | Muller . |
| 5,150,125 | 9/1992 | Muller . |
| 5,316,468 | 5/1994 | Gunther . |
| 5,492,467 | 2/1996 | Hume . |
| 5,993,190 | * 11/1999 | Merriman ............................ 425/567 |

FOREIGN PATENT DOCUMENTS

| | | |
|---|---|---|
| 3206157 | 9/1983 | (DE) . |
| 0344381 | 12/1989 | (EP) . |
| 63-231917 | 9/1988 | (JP) . |
| WO8704112 | 7/1987 | (WO) . |

OTHER PUBLICATIONS

Cincinnati Milacron, (Brochure) "RoboShot, All Electric Injection Molding Machines", 1997, pp. 1–30.
U.S. application No. 09/028379, Merriman, filed Feb. 24, 1998, pending.

* cited by examiner

Primary Examiner—Tim Heitbrink
(74) Attorney, Agent, or Firm—John P. O'Brien; Mark W. Croll; Donald J. Breh

(57) ABSTRACT

An injection molding system having a locating ring disposed about and engaged with a pressure bushing. The locating ring is fastened to an outer surface of a clamp plate facing a platen. A first side of the locating ring is disposed against the outer surface of the clamp plate and a portion of a second side of the locating ring is disposed against the platen, thereby supporting the locating ring. The first side of the locating ring is preferably disposed in a recessed mounting surface on the clamp plate and the second side of the radial outer portion of the locating ring is flush with the outer surface of the clamp plate so that both the clamp plate and outer portion of the locating ring are engaged with the platen.

19 Claims, 2 Drawing Sheets

INJECTION MOLDING SYSTEM WITH PRESSURE BUSHING LOCATING RING

CROSS REFERENCE TO RELATED APPLICATIONS

The present application is related to U.S. application Ser. No. 09/028,379, filed Feb. 24, 1998, entitled "Injection Molding System With Improved Pressure Bushing" now U.S. Pat. No. 5,993,190, assigned commonly herewith and incorporated herein by reference.

BACKGROUND OF THE INVENTION

The invention relates generally to injection molding systems, and more particularly to improved pressure bushing locating rings therefor and combinations thereof.

Injection molding systems are known and comprise generally a hydraulic or electric injection molding machine coupled to one or more mold cavities. The injection molding machine and more particularly an extrusion nozzle thereof supplies a molten material, usually plastic, to the one or more mold cavities through a cold or hot runner system.

In some injection molding systems, the extrusion nozzle seats on a pressure bushing disposed between the injection molding machine and the hot or cold runner system. In FIG. 3 of the present application, an injection molding system 10 comprises a pressure bushing 12 coupled to a hot tip system 19 by a prior art locating ring 14 fastened to a clamp plate 16 by several bolts 18 engaged therewith. In these and other injection molding system configurations, the extrusion nozzle of the injection molding machine, not illustrated in FIG. 3, seats on an input side 13 of the pressure bushing 12 and injects molten material through the pressure bushing and into the mold cavities. In many other systems a distribution manifold supplies the molten material to several hot runner systems.

In some molding operations however the immense pressure exerted on the mold cavity side of the pressure bushing 12 by the molten material supplied therethrough urges the locating ring away from the clamp plate 16 to such an extent that the bolts or locating ring may become deformed or that molten material leaks from in and around the pressure bushing. In some cases, the pressure is so great that the bolts 18 retaining the locating ring 14 on the clamp plate 16 fail by breaking.

The present invention is drawn toward advancements in the art of injection molding systems, and more particularly to novel pressure bushing locating rings and combinations thereof.

An object of the invention is to provide novel injection molding systems and novel pressure bushing locating rings therefor that overcome problems in the art.

Another object of the invention is to provide novel injection molding systems and novel pressure bushing locating rings that are robust and economical.

Another object of the invention is to provide novel injection molding systems and novel pressure bushing locating rings that are less likely to fail under pressure exerted by molten material supplied through the pressure bushing retained thereby.

A further object of the invention is to provide novel injection molding systems having novel pressure bushing locating rings disposed between a clamp plate and a platen, whereby the platen supports at least a portion of the locating ring.

A more particular object of the invention is to provide novel injection molding systems comprising generally a locating ring disposed about and engaged with a pressure bushing. A first side of the locating ring is disposed against the outer surface of the clamp plate and an opposing second side of the locating ring is disposed against the platen, thereby supporting the locating ring. The first side of the locating ring is preferably disposed in a recessed mounting surface on the clamp plate and at least a portion of the second side of the locating ring is flush with the outer surface of the clamp plate so that both the clamp plate and radial outer portion of the locating ring are engaged with the platen.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

DETAILED DESCRIPTION OF THE INVENTION

Figure 1:
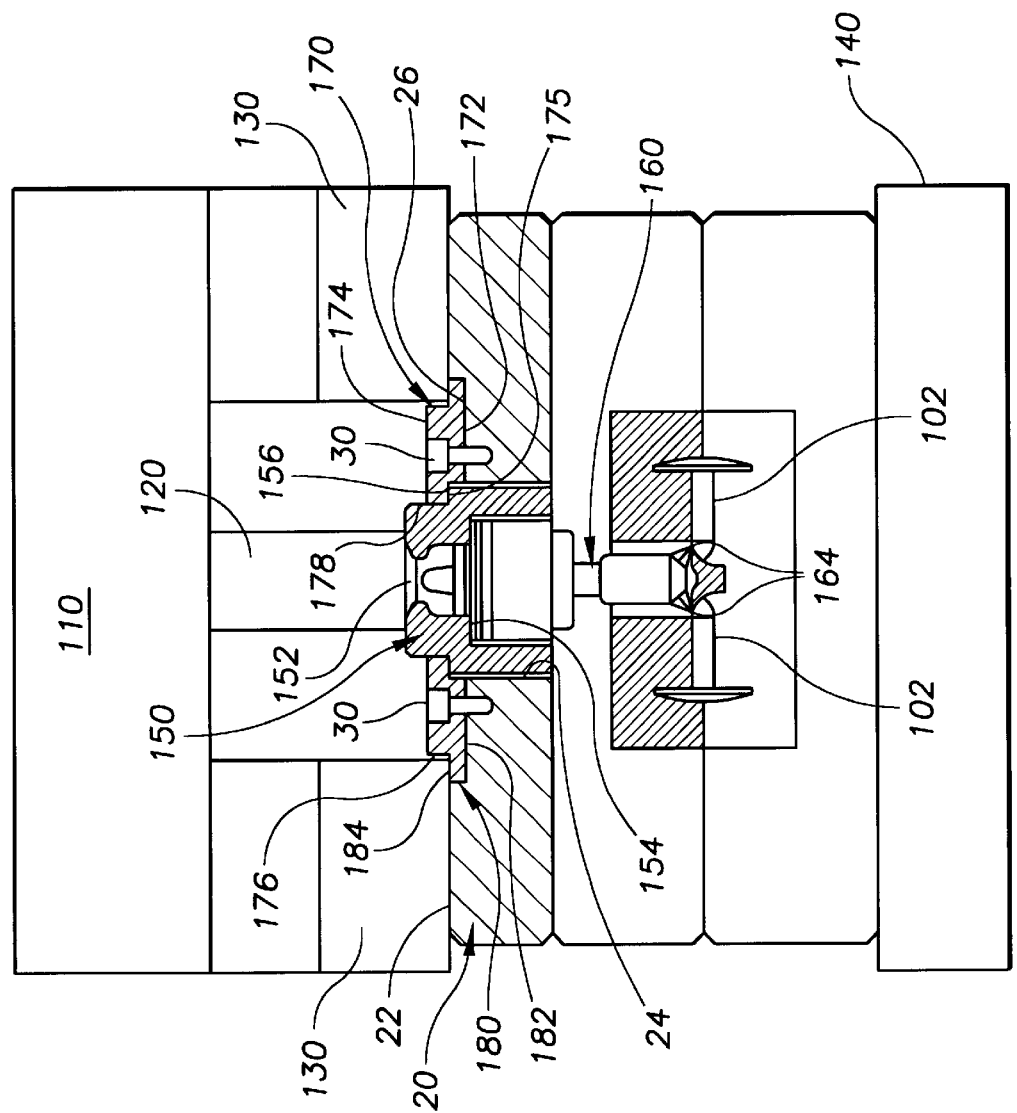
FIG. 1 is a partial sectional view of an injection molding system having a pressure bushing locating ring according to an exemplary embodiment of the invention.
Figure 3:
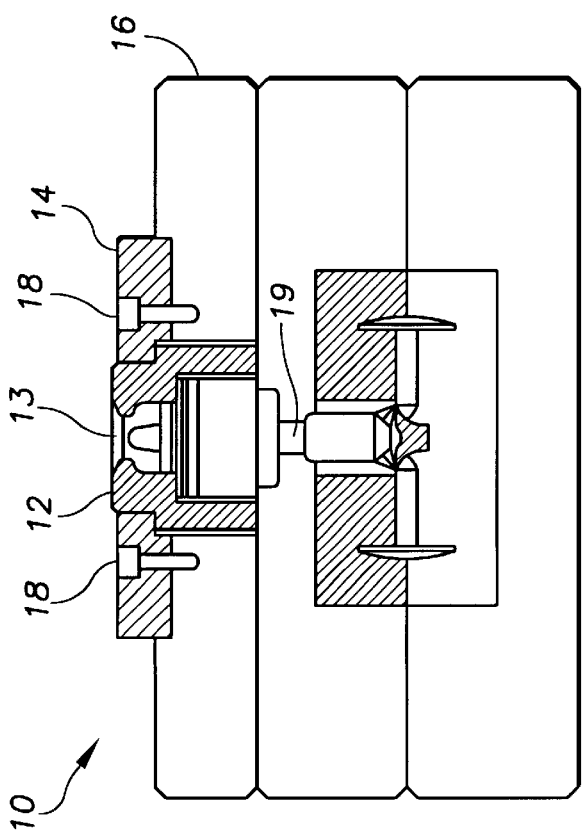
FIG. 3 is a partial sectional view of an injection molding system having a prior art pressure bushing locating ring.

FIG. 1 illustrates an exemplary injection molding system configuration 100 comprising generally an injection molding machine 110, shown in part, having a molten material extrusion nozzle 120 that supplies molten material therefrom to one or more mold cavities 102 disposed between first and second platens 130 and 140. One of the first and second platens is fixed and the other is generally movable to permit clamping the one or more mold cavities therebetween, as is known generally. In the exemplary embodiment, the fixed and movable platens are part of the injection molding machine.

The injection molding machine 110 is preferably an electric injection molding machine, for example, one of the ROBOSHOT all electric machines, Model Nos. 17R, 33R, 55R and others available from Cincinnati MILACRON, Plastics Machinery Group, Batavia, Ohio. These and other electric injection molding machines have fixed and movable platens between which the one or more mold cavities are disposed and retained. Alternatively, the injection molding machine may be a hydraulic injection molding machine.

The injection molding machine is coupled generally to the mold cavities by a pressure bushing. In FIG. 1, a pressure bushing 150 comprises generally an opening or passage therethrough, a passage inlet on an inlet end 152 thereof for accommodating an end portion of the extrusion nozzle 120, and a passage outlet on an outlet end 154 thereof coupled to the mold cavities, as discussed further below. The pressure bushing 150 also includes a shoulder flange 156, which in the exemplary embodiment has an annular shape, on an outer portion thereof for locating and mounting the pressure bushing, also discussed below. In one embodiment, the pressure bushing is of the type disclosed more fully in U.S. application Ser. No. 09/028,379 entitled "Injection Molding System With Improved Pressure Bushing".

The pressure bushing outlet is generally coupled to one or more mold cavities by a hot or cold runner system that supplies the molten material from the extrusion nozzle to the mold cavities. Alternatively, the pressure bushing outlet may be coupled to a manifold that distributes the molten material to multiple mold cavities, for example through several hot tip systems each having an inlet portion coupled to the manifold and one or more hot tips coupled to corresponding mold cavities.

In the exemplary embodiment of FIG. 1, the pressure bushing outlet 154 is coupled to a hot tip system 160 having a molten material inlet for receiving molten material supplied through the pressure bushing passage from the injection molding machine 110. The hot tip system also includes one or more tips 164 coupled to corresponding mold cavities 102 for supplying molten material thereto, as is known generally. The hot tip system is for example one of the thermocouple controlled, HPS Single or Multi-Tip Nozzle Standard or Special Systems available from Ewikon N.A. Incorporated, Elgin, Ill., among other commercially available hot runner systems.

The pressure bushing is retained generally by a locating ring 170 fastened to a clamp plate 20, and more particularly to an outer surface 22 of the clamp plate 20 facing the platen 130. In the exemplary embodiment, the pressure bushing passage is aligned with an opening 24 of the clamp plate and the pressure bushing 150 is disposed at least partially therein. A plurality of threaded fasteners 30 are disposed through corresponding openings 171 in the locating ring 170 and into the clamp plate to retain the locating ring on the clamp plate.

Generally, a first side of the locating ring is disposed and retained against the outer surface of the clamp plate by the fasteners, and a second side of the locating ring is disposed against the platen, which thereby further supports the locating ring during operation of the injection molding machine. The first side of the locating ring is preferably disposed in a recessed mounting surface on the clamp plate and at least a portion of the second side of the locating ring is mounted flush with the outer surface of the clamp plate so that both the clamp plate and a portion of the locating ring are engaged with and supported by the platen.

In FIG. 1, the locating ring 170 generally comprises opposing first and second sides 172 and 174, a radial outer end 176, and an opening 178 therethrough. The locating ring 170 also comprises a radial outer portion, which in the exemplary embodiment is configured as a radial flange 180 extending radially outwardly from at least a portion of the outer radial end 176 thereof.

The locating ring flange 180 also comprises generally opposing first and second sides 182 and 184 corresponding to the first and second sides 172 and 174 of the locating ring 170. In the exemplary embodiment of FIG. 1, the first side of flange 182 and the first side of the locating ring 172 are coplanar, so that both first sides 172 and 182 are mounted on the outer surface 22 of the clamp plate 20. Also, the second side 184 of the locating ring flange 180 is axially offset relative to the second side 174 of the locating ring 170 so that the radial outer end 176 of the locating ring forms a step therebetween. Thus configured, the second side 174 of the locating ring protrudes relative to the second side of the flange 184 when the locating ring is mounted on the outer surface of the clamp plate.

The radial flange 180 is preferably a continuous member disposed generally concentrically about the perimeter of the locating ring. Alternatively, the radial flange comprises a plurality of two or more discrete flange elements disposed about at the locating ring.

Figure 2:
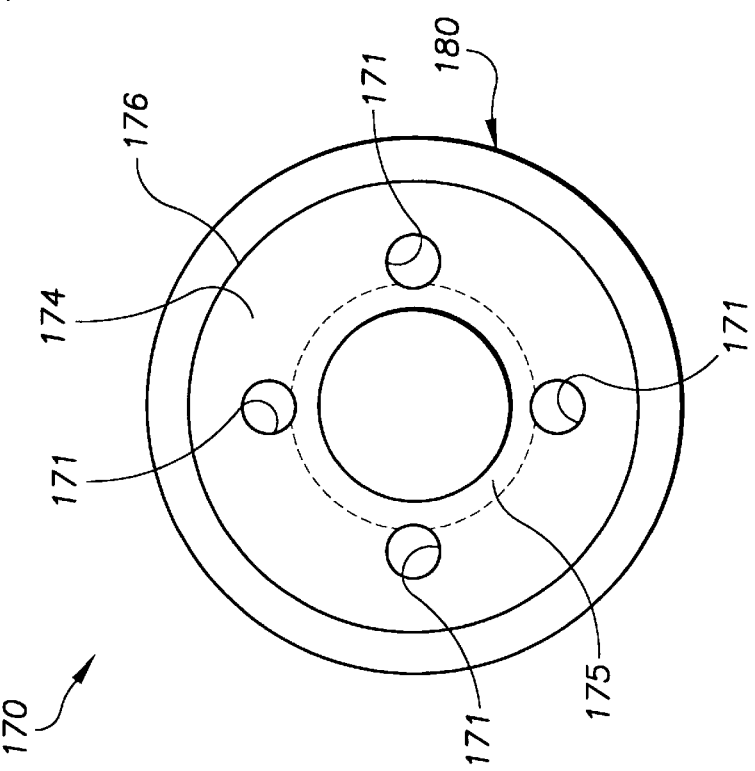
FIG. 2 is a top plan view of a pressure bushing locating ring according to an exemplary embodiment of the present invention.

The locating ring 170 is generally disposed about and engaged with the pressure bushing 150, and in the exemplary embodiment the locating ring aligns and retains the pressure bushing in molten material communication between the injection molding machine 110 and the hot runner system 160. In FIGS. 1 and 2, the locating ring 170 has a pressure bushing recess 175 formed on the first side 172 thereof about the opening 178 therethrough. In FIG. 1, the pressure bushing recess 175 is mounted on and engaged with the shoulder flange 156 of the pressure bushing 150 when the locating ring 170 is mounted on the clamp plate 20.

The first side 172 of the locating ring is disposed generally against the outer surface 22 of the clamp plate 20 and the second side of at least a portion of the locating ring 170, preferably including at least the radial outer portion thereof, is disposed generally against the platen 130. Thus configured, the locating ring 170 is buttressed or supported by the platen 130, which prevents the locating ring 170 from moving outwardly away from the clamp plate 20 under pressure induced forces exerted by the molten material, thereby reducing the load, for example tensile stress, on the fasteners 30.

In the exemplary embodiment, the second side 184 of the radial flange 180 comprises the radial outer portion of the locating ring that is engaged with the platen 130, and the second side 174 of the locating ring 170 protrudes from the outer surface 22 of the clamp plate 20. The fastening openings 171 through the locating ring are preferably located radially inwardly of a radial outer portion of the locating ring nearer the opening 178 therethrough, where greater clamping action is provided for the pressure bushing 150.

The outer surface 22 of the clamp plate 20 is also preferably disposed against the platen 130. Thus in the exemplary embodiment of FIG. 1, the clamp plate 20 comprises a mounting surface 26 disposed in a recess on the outer surface 22 of the clamp plate 20 about the opening 24 thereof. When the first side 172 of the locating ring, preferably including the first side 182 of the flange 180, is disposed against the mounting surface 26 in the recess of the clamp plate, the second side 174 of the locating ring, preferably including at least the second side of the flange 180, is mounted flush with the outer surface 22 of the clamp plate 20. According to this preferred configuration, the second side 182 of the locating ring flange 180 and a portion of the outer surface 22 of the clamp plate are both disposed against the platen 130, which provides support therefor.

While the foregoing written description of the invention enables one of ordinary skill in the art to make and use what is at present considered to be the best mode of the invention, it will be appreciated and understood by those of ordinary skill the existence of variations, combinations, modifications and equivalents within the spirit and scope of the specific exemplary embodiments disclosed herein. The present invention is therefore to be limited not by the specific exemplary embodiments disclosed herein but by all embodiments within the scope of the appended claims.

What is claimed is:

1. An injection molding system comprising:
    a platen;
    a clamp plate having an outer surface facing the platen;
    a pressure bushing;
    a locating ring having generally opposing first and second sides, a radial outer portion, and an opening therethrough, the locating ring disposed about and engaged with the pressure bushing, the first side of the locating ring disposed against the outer surface of the clamp plate, at least a portion of the second side of the locating ring disposed against the platen.

2. The system of claim 1, the clamp plate having an opening, the pressure bushing having a molten material passage therethrough aligned with the opening of the clamp plate.

3. The system of claim 1, the radial outer portion of the locating ring is a flange having generally opposing first and second sides corresponding to the first and second sides of the locating ring, a mounting surface disposed in a recess on the outer surface of the clamp plate, the first side of the locating ring flange disposed against the mounting surface in the recess of the clamp plate, the second side of the locating ring flange disposed against the platen.

4. The system of claim 3, the outer surface of the clamp plate disposed against the platen.

5. The system of claim 3, the second side of the locating ring flange flush with the outer surface of the clamp plate, the outer surface of the clamp plate disposed against the platen.

6. The system of claim 5, the clamp plate having an opening, the mounting surface of the clamp plate disposed about the opening thereof, the pressure bushing disposed at least partially in the opening of the clamp plate.

7. The system of claim 1, the pressure bushing includes a shoulder flange on an outer portion thereof, the locating ring has a pressure bushing recess disposed on the first side thereof about the opening therethrough, the pressure bushing recess is engaged with the shoulder flange of the pressure bushing.

8. The system of claim 3, a plurality of threaded fasteners disposed through the locating ring and into the clamp plate, the plurality of fasteners located inwardly of the locating ring flange nearer the opening of the locating ring.

9. The system of claim 1, an injection molding machine, a mold cavity, and a hot tip system having a tip with a molten fluid outlet, the pressure bushing coupling the injection molding machine to the hot tip system, the molten fluid outlet of the tip coupled to the mold cavity.

10. An injection molding system comprising:

an injection molding machine having a platen;

a mold cavity;

a hot tip system having a molten material inlet and a molten material outlet coupled to the mold cavity;

a pressure bushing having a molten material passage therethrough, the passage having an inlet on an inlet side of the pressure bushing and an outlet on an outlet side of the pressure bushing, the outlet of the pressure bushing coupled to the molten material inlet of the hot tip system;

a clamp plate having an opening and an outer surface facing the platen, the pressure bushing disposed at least partially in the opening of the clamp plate;

a locating ring having generally opposing first and second sides and an opening therethrough, the locating ring having a flange extending radially outwardly from at least a portion of an radial outer end thereof, the locating ring disposed about and engaged with the pressure bushing, the first side of the locating ring disposed against the outer surface of the clamp plate, the flange of the locating ring disposed against the platen of the injection molding machine.

11. The system of claim 10, the injection molding machine having a material extrusion nozzle engageable with the inlet of the pressure bushing.

12. The system of claim 10, a mounting surface of the clamp plate disposed in a recess about the opening thereof, the flange of the locating ring disposed in the recess of the clamp plate.

13. The system of claim 10, the flange of the locating ring having generally opposing first and second sides corresponding to the first and second sides of the locating ring, a mounting surface of the clamp plate disposed in a recess about the opening thereof, the first side of the locating ring flange disposed against the mounting surface in the recess of the clamp plate, the second side of the locating ring flange disposed against the platen of the injection molding machine.

14. The system of claim 13, the second side of the locating ring flange flush with the outer surface of the clamp plate, the second side of the locating ring protruding relative to the outer surface of the clamp plate, a plurality of fasteners disposed through the second side of the locating ring and into clamp plate.

15. The system of claim 14, the outer surface of the clamp plate disposed against the platen of the injection molding machine.

16. The system of claim 13, a plurality of threaded fasteners disposed through the locating ring radially inwardly of the flange nearer the opening thereof and into the clamp plate.

17. The system of claim 16, the pressure bushing includes a shoulder flange on an outer portion thereof, the locating ring has a pressure bushing recess disposed on the first side thereof about the opening therethrough, the pressure bushing recess is engaged with the shoulder flange of the pressure bushing, the flange is annular.

18. A locating ring for mounting a pressure bushing in an opening of a clamp plate opposite a platen of an injection molding machine, comprising:

a generally annular body member having generally opposing first and second sides, a radial outer end, and an opening therethrough;

a pressure bushing recess disposed on the first side of the body member about the opening thereof;

a flange extending radially outwardly from at least a portion of the radial outer end of the body member, the flange having generally opposing first and second sides corresponding to the first and second sides of the body member, a plurality of fastening openings disposed through the body member in a portion thereof radially inwardly of the annular flange nearer the opening of the locating ring.

19. The locating ring of claim 18, the opening is located concentrically in the body member, and the flange is a concentric annular flange.

\* \* \* \* \*